Sept. 21, 1965         G. SLAYTER ETAL         3,206,846
           METHOD OF PRODUCING A LAMELLAR METAL STRUCTURE
Original Filed July 22, 1957                    2 Sheets-Sheet 1
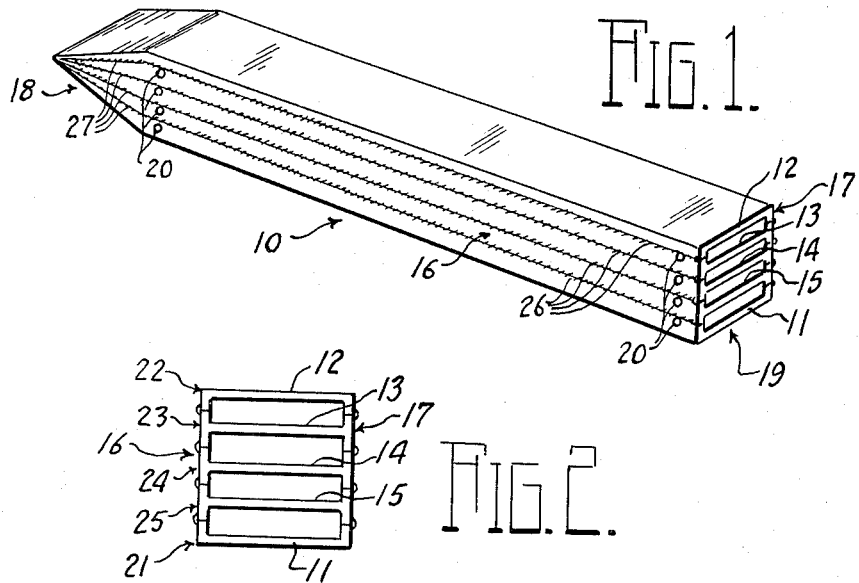
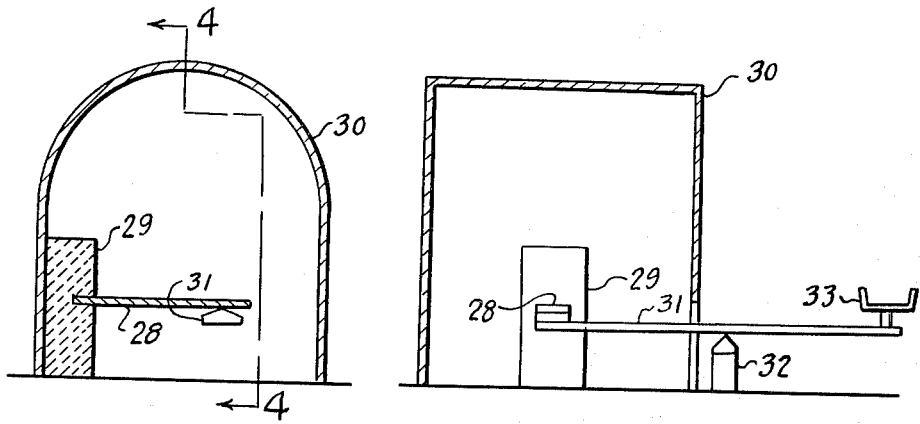
INVENTORS
Games Slayter
Robert M. Woodward
BY
ATTORNEYS Sept. 21, 1965  G. SLAYTER ETAL  3,206,846
METHOD OF PRODUCING A LAMELLAR METAL STRUCTURE
Original Filed July 22, 1957  2 Sheets-Sheet 2

INVENTORS
Games Slayter
Robert M. Woodward

ATTORNEYS

United States Patent Office 3,206,846
Patented Sept. 21, 1965

3,206,846
METHOD OF PRODUCING A LAMELLAR METAL STRUCTURE
Games Slayter and Robert M. Woodward, Newark, Ohio, assignors to Owens-Corning Fiberglas Corporation, a corporation of Delaware
Original application July 22, 1957, Ser. No. 673,188, now Patent No. 3,109,716. Divided and this application Apr. 18, 1962, Ser. No. 188,487
14 Claims. (Cl. 29—470)

This application is a divisional application of Slayter et al. application Serial No. 673,188, filed July 22, 1957, now U.S. Patent 3,109,716.

This invention relates to a lamellar metal structure, and, more particularly, to such a structure comprising two integrated layers, one of which comprises primarily a noble metal, and the other of which comprises primarily a plurality of bodily separate masses of a hard, refractory material dispersed in a matrix of at least one noble metal. Such a laminate has a combination of desirable properties which has not heretofore been achieved, so far as is known.

Various noble metal alloys have heretofore been used to perform specific functions where their unique properties have justified their high cost. As a specific example of such use, certain assemblies made from noble metal alloys have been employed in conjunction with glass melting tanks, often as inserts through which streams of molten glass flow and are attenuated into fibers of desired diameters. The highly refractory nature of the alloys, and their resistance to abrasion by molten glass are properties, in such applications, which justify the expense involved. There is a substantial need, however, for noble metal alloys which have even better high temperature strength properties, and even greater resistance to sag and creep under high temperature operating conditions, specifically, at temperatures near the melting points of the noble metals.

Many instances have previously been reported of improving high temperature strength properties and resistance to sag and creep of metals by using techniques of powder metallurgy. Improvements in these properties have been achieved by sintering a shape pressed from a mixture of the powdered metal and a hard, refractory, particulate material. Such products, when a continuous metal phase was produced, have been called cermets. In cermets, improved high temperature strength and resistance to creep and sag are achieved but with corresponding loss of machinability and ductility. What has been denominated "Sintered Aluminum Powder" is an example of a cermet which can be so produced from a mixture of powdered aluminum and powdered alumina.

It might be expected that such high temperature properties of noble metal alloys could be improved by similar powdered metallurgical techniques. However, when powdered alumina, for example, is mixed with a powdered noble metal or noble metal-alloy, and the mixture is pressed to a desired shape and the shape fired, it is found that the resulting product is so brittle as to be worthless for use in connection with glass melting tanks, as suggested above.

It has been found by Dr. Thomas S. Shevlin, The Ohio State University, that a brittle base metal sheet generally of the type described in the preceding paragraph can be laminated with a base metal sheet to produce a sandwich-type, or lamellar-structure which is comparatively ductile by virtue of the pure metal portion thereof, and has improved impact resistance, high temperature strength and resistance to sag or creep by virtue of the portion thereof which includes refractory particles.

When it is attempted to produce a lamellar structure from a layer of the brittle noble metal-alumina product identified above and a noble metal- or noble metal alloy-layer, however, it is found that techniques which are suitable when working with base metals are useless. For example, if a brittle sheet produced by sintering a mixture composed of 5 volume percent of alumina and 95 volume percent of an alloy of 90 weight percent platinum and 10 weight percent rhodium (such an alloy is hereinafter, for convenience, referred to as "Alloy A") is placed between two Alloy A sheets to produce a lamellar structure, and the resulting structure is hot pressed at a suitable temperature of about 2500° F., it is found that the brittle layer has crumbled during processing, but fragments thereof have not been bonded to any appreciable extent to the Alloy A layers. Similarly, no adhesion is obtained if the powdered constituents of the brittle layer, 5 volumes of powdered alumina and 95 volumes of powdered Alloy A, are so positioned between two sheets of Alloy A and hot pressed. So far as is known, there was no available way, prior to the instant invention, for producing an integrated laminate composed of a brittle noble metal-alumina layer and a noble metal- or noble metal alloy-layer. Similarly, there was no way known for producing a useful article comprising a noble metal or noble metal alloy continuous phase with a plurality of bodily separate masses of a hard, refractory material dispersed therein.

The terms "percent" and "parts" are used herein, and in the appended claims, to refer to percent and parts by weight, unless otherwise indicated.

The present invention is based upon the discovery of a method for producing a lamellar structure comprising at least two integrated layers, one of which consists essentially of at least one noble metal, and the other of which consists essentially of a plurality of bodily separate masses of a hard, refractory material dispersed in a matrix of at least one noble metal. Such a structure has properties which are predominantly metallic in nature, and can have high temperature strength and resistance to creep or sag characteristics which are better than any known noble metal or noble metal alloy.

It is, therefore, an object of the invention to provide an improved noble metal- or noble metal alloy-structure.

It is a further object of the invention to provide an integrated lamellar structure comprising a noble metal or noble metal alloy layer and a layer, structurally integral with the first layer, which is composed of a plurality of masses of a hard, refractory material dispersed in a noble metal- or noble metal alloy-matrix.

It is a further object of the invention to provide a method for producing such a lamellar structure.

Other objects and advantages will be apparent from the description which follows, which is intended only to illustrate and disclose, but in no way to limit, the invention, reference being had to the accompanying drawings, in which—

FIG. 1 is a view in perspective, showing an envelope structure which is useful in producing a laminate according to the invention;

FIG. 2 is an end view of an assembly which represents one step in the production of the envelope of FIG. 1;

FIG. 3 is a schematic representation in vertical section showing details of a test apparatus that has been used to demonstrate the improvement of physical properties achieved with a laminate according to the invention;

FIG. 4 is a schematic sectional view along the line 4—4 of FIG. 3 showing further details of the test apparatus.

Figure 5:
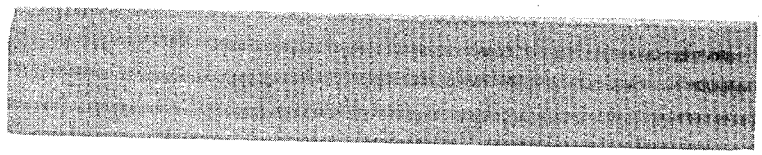
FIG. 5 is a reproduction of a photomicrograph of a lamellar structure according to the invention.

According to the invention an improved lamellar structure is provided. Such lamellar structure comprises a layer consisting essentially of at least one noble metal, and a second layer structurally integral with the first layer, the second layer consisting essentially of a plurality of bodily separate masses of a hard, refractory material dispersed in a matrix consisting essentially of at least one noble metal.

One layer of a lamellar structure according to the invention consists essentially of at least one noble metal, and another layer in such structure includes a matrix which consists essentially of at least one noble metal. Such layer or matrix can include any of the noble metals, platinum, palladium, rhodium, iridium, ruthenium, osmium, silver and gold, the last four usually only as alloying ingredients, and up to about 3 percent, and can, in some instances, contain limited amounts of certain base metals. For example, certain noble metal alloys with nickel possess favorable properties for utilization at elevated temperatures. Platinum, palladium and rhodium, and alloys thereof, are the most useful, and therefore preferred, noble metals in lamellar structures according to the invention. Platinum and rhodium and their alloys have low vapor pressures at temperatures in the vicinity of 2500° F., which temperatures metal parts must withstand when used in contact with molten glass. It is known that the vapor pressure of platinum, in millimeters of mercury, is $1.1 \times 10^{-12}$ at 1832° F., and $1.1 \times 10^{-6}$ at 2732° F. The vapor pressure of rhodium parallels that of platinum. One the other hand palladium, ruthenium, osmium, iridium, gold and silver all have significant vapor pressures at such temperatures, and are volatilized, in some cases as the oxides, at an appreciable rate when used in this way at such high temperatures. However, lamellar structures according to the invention wherein either the metal layer or the matrix of the layer integrated therewith comprises palladium, ruthenium, osmium, iridum, gold or silver are significantly improved over similar structures made from the pure metals. Palladium can be present in the case of lamellar structures according to the invention for service up to about 2400° F., gold and silver in structures for somewhat lower service temperatures, and ruthenium, osmium and iridium in structures for somewhat higher service temperatures. Limited amounts of gold, e.g., up to about 3 percent, can be used to advantage in alloys to make them less wettable by molten glass.

The plurality of bodily separate masses of a hard, refractory material dispersed in a noble metal or alloy matrix in one of the layers of a lamellar structure according to the invention are preferably refractory metal oxides, and can be particulate, or can be in the form of fibers or flakes. Preferred refractory metal oxide materials for extremely high temperature service are alumina ($Al_2O_3$), zirconia ($ZrO_2$), thoria ($ThO_2$) and beryllia (BeO). These materials are used in particulate form only, unless glass-forming ingredients are associated therewith. When beryllia (BeO) or thoria is used as the refractory material, care should be taken in processing to avoid hazard to personnel. Other hard, refractory materials dispersed in a noble metal matrix, however, can also be employed. As a specific further example, silica glasses and any of many other known high temperature glasses can be used where a noble metal structure having added strength at relatively lower temperatures is required. When fiberizable high temperature glasses are used as the refractory material, they can be either in fibrous or particulate form, preferably the former.

A lamellar structure according to the invention can be produced according to the method of the invention. Such method comprises assembling a plurality of sheets, each of which sheets consists essentially of at least one noble metal, and a material consisting essentially of at least one noble metal and a plurality of bodily separate masses of a hard, refractory material, preferably coated with at least one noble metal, into a structure wherein the material is disposed between adjacent noble metal sheets, and subjecting the structure so produced to heat and pressure for a time sufficient to produce an integrated lamellar structure.

Satisfactory results have been secured using hard particulate refractory materials when these have ranged in size from about ¼ micron to about 10 microns. Particulate alumina having a size of about 0.3 micron has been utilized with excellent results. Where the refractory material is fibrous, for example is aluminum silicate fibers or is any of numerous other known refractory fibers, such fibers should have a diameter of from about ¼ micron to about 30 microns.

The noble metal sheets used in accordance with such method can be any of those previously discussed, and the hard, refractory material can be any of those previously discussed. It is preferred that the hard, refractory material, whether in the form of fibers, flakes or particles, be coated with a noble metal or with a noble metal alloy, because, as has previously been indicated, it is somewhat more difficult to produce a lamellar structure from a plurality of masses of an uncoated, hard, refractory material dispersed in a noble metal matrix and adhered to a noble metal sheet. The noble metal coating can be provided on the hard, refractory material in any suitable way. A preferred method for applying such coating involves the step of immersing the material in a solution of a compound of the noble metal or noble metal alloy.

A specific way for applying a particular coating to a hard refractory material, as well as the use of such coated material in the production of a lamellar structure according to the invention, will now be described by way of example.

*Example 1*

A 100 gram portion of Alloy A, identified above, was dissolved in 300 cc. of concentrated aqua regia. The resulting solution comprising chloroplatinic acid and chlororhodic acid was evaporated to a syrupy state, and the syrupy material remaining was mixed with a 50 cc. portion of 37 percent hydrochloric acid. This solution was again evaporated to a syrupy condition, and the resulting syrup was again mixed with a 50 cc. portion of 37 percent hydrochloric acid. The resulting solution was again evaporated to a syrup, and the syrup again mixed with a 50 cc. portion of 37 percent hydrochloric acid; re-evaporated to a syrup; mixed with 50 cc. of distilled water, re-evaporated to a syrup; and finally diluted with distilled water to produce a final solution of chloroplatinic acid and chlororhodic acid in a concentration of 0.1 gram of solids, calculated as pure Alloy A, per cc. A 40 cc. portion of 85 percent hydrazine hydrate was then added, with stirring, to the final solution, at a temperature of 150° F.; the solution was made alkaline with ammonium hydroxide; and an additional 10 cc. portion of 85 percent hydrazine hydrate was added to the alkaline material. A precipitate of finely divided, particulate Alloy A was allowed to settle; was collected on a filter paper; was washed with distilled water; and was dried.

A 495.5 gram portion of finely divided particulate Alloy A produced as described in the preceding paragraph and a 4.5 gram portion of graded, 0.3 micron powdered, fused alumina were charged into a 1 quart ball mill which was lined with a refractory material and contained 135 ceramic balls of approximately ½ inch diameter. A 165 cc. portion of the final solution of chloroplatinic acid and chlororhodic acid, produced as described in the preceding paragraph was mixed with 50 cc. of distilled water to produce a diluted final solution, and the diluted final solution was added to the charge in the ball mill. The entire charge was then ball milled for 24 hours. The ball milled charge was dried and heated to 700° F. in air to decompose the chloroplatinic acid and chlororhodic acid to platinum and rhodium. The material was then reduced at 700° F. for 15 minutes in hydrogen.

A part of the finely divided particulate material produced as described above, and consisting essentially of 0.3 micron alumina powder coated with Alloy A, and intimately associated with finely divided Alloy A, was pressed into sheets approximately 6 inches in length, 1 inch in width and ¼ inch in thickness, and heated in air to 2500° F. to sinter the particles together. The resulting sheets were gray in appearance, and brittle.

A particulate material comprising a mixture of powdered Alloy A and 0.3 micron fused alumina grains coated with Alloy A, produced as described above, was poured into voids within an open-ended envelope structure indicated generally at 10 in FIG. 1, which envelope was made entirely of Alloy A. A sheet 11 of Alloy A constituted the bottom of the envelope 10, a sheet 12 of Alloy A constituted the top thereof, and sheets 13, 14 and 15, of Alloy A, which were parallel to one another and to the sheets 11 and 12, divided the space between the top and bottom sheets into four compartments of approximately equal height. An adjacent side 16 of the envelope as well as an opposed size 17 was completely closed, as was an end 18 of the envelope 10. The mixture of powdered material was poured into an open end 19 of the envelope, and filled the voids between adjacent ones of the sheets 11, 12, 13, 14 and 15. The remaining open end of the envelope was then closed, as subsequently discussed, and an opening 20 approximately 0.020 inch in diameter, was provided through each end of the wall 16 to enable the escape of air from each of the compartments within the envelope during subsequent processing. A sheet of vitrified mullite was then placed in contact with the exterior of the sheet 11 and with the exterior of the sheet 12, and a sheet of a heat resistant iron-nickel-chromium alloy was placed in contact with the opposite surface of each mullite sheet. The entire assembly was then placed under compression by tightening a C clamp against the heat resistant alloy sheets. The C clamp was tightened manually, so that the total pressure exerted thereby was of the order of about 500 pounds. Electrical contacts were then applied to the ends of the envelope structure, and electricity was passed therethrough to heat the assembly to 2500° F., and to maintain the assembly at 2500° F. for 1 hour. The C clamp was then removed from the envelope, and the envelope was heated in a furnace to 2500° F., in contact with air, and then hot rolled to a desired thickness of about 3/16 inch.

The procedure described in the preceding paragraph was also repeated except that the sintered sheets produced from the particulate mixture of Alloy A and coated alumina grains, produced as described above, were positioned within the envelope instead of the particulate mixture itself. Otherwise, the fabricating steps were identical with those previously described.

The envelope 10 was produced from two U-shaped members made of Alloy A, and designated 21 and 22, and three H-shaped members made of Alloy A, and designated 23, 24 and 25, assembled as shown in FIG. 2. These members, when so assembled, produce the envelope 10, except that both ends are open, and except that the component U and H-shaped members are bodily separate. The first step in producing the envelope structure, therefore, is to make welds along each of the lines of abutment between component members. This can be done with an oxy-hydrogen torch. The resulting weldments are designated at 26 in FIG. 1. The next step in producing the envelope 10 is to close the end 18, by compression thereof in a suitable die, followed by oxy-hydrogen welding to close all openings therethrough. The resulting weldments are designated at 27 in FIG. 1.

When an envelope identical with that described above is filled with sintered sheets produced from the same mixture of ball milled alumina particles and Alloy A particles, and either ground dry or ground in the presence of water, without providing an Alloy A coating on the alumina, somewhat poorer bonding between the discrete layers is noted after hot pressing, but the final structure is a sound laminate, and is useful, for example, for the fabrication of bushings for glass melting tanks by ordinary techniques.

It will be apparent from the foregoing example that one specific way of applying a noble metal- or noble metal alloy-coating on bodily separate masses of a hard, refractory material to be used in producing a laminar structure according to the invention involves treating the masses of the material with a solution of a compound of the noble metal or noble metal alloy, and then drying the solution and converting the compound to the noble metal or noble metal alloy. It is to be appreciated, however, that such noble metal or noble metal alloy coating can also be applied in other ways, which will be apparent to one skilled in the art, and that the invention is not limited to the application of such coating in the indicated way.

It will also be appreciated that, while the use of an envelope structure wherein sintered sheets or constituents thereof are positioned between spaced, parallel, noble metal- or noble metal alloy-sheets which are supported in position is a preferred way for practicing the invention, either sintered sheets or constituents used to produce such seets can merely be positioned between noble metal- or noble metal alloy-sheets and hot pressed to achieve the result.

Where extremely pure noble metal laminates are desired, contact between the noble metal and base metals should be avoided at all times when the noble metal is at an elevated temperature. Contact between the noble metal and certain oxide materials such as vitreous mullite does not cause contamination, because of the inherent repugnance of noble metals to such oxides. The laminar structure, so far as can be determined by available methods, is not contaminated by hot pressing in contact with vitreous mullite in sheet form.

The elevated temperature properties of the 3/16 inch thick laminar structures produced as described above were compared with the elevated temperature properties of pure Alloy A sheets of the same size by the following comparative tests:

A specimen, designated 28 in FIGS. 3 and 4, 3½"×½" ×3/16", was rigidly attached within a vitreous mullite block 29 to a depth of ½" and supported in a globar heated furnace 30.

A simple lever 31 of iron-nickel-chromium alloy was used for a short-time test, with one end resting under the specimen 28, ½" from the free end thereof, and with the lever 31 supported on a fulcrum 32. A platform 33 was provided on the free end of the lever 31 to receive weights.

At 2000° F., an alloy A specimen was bent when 1500 grams were placed on the platform 33, while 1800 grams were required to bend a specimen of the laminated structure produced as described in Example 1.

It will be apparent that various combinations of temperatures and pressure can be used in the hot pressing step which is involved in producing a laminar structure according to the invention. The hot rolling operation furthers the integration of the separate layers. The final laminar structure is one wherein the separate layers are integrated, as can be seen by an examination of FIG. 5 of the drawings, which is a photomicrograph of a sample cut from a final rolled sheet which was produced by the procedure described in Example 1 wherein a particulate mixture of Alloy A and alumina coated with Alloy A was hot pressed in the envelope. It is believed that, if a sufficiently high pressure is employed, an integrated structure can be produced in a matter of a few minutes at 2500° F., for example, or in a longer period of time at a somewhat lower temperature. The interdependence of pressure and temperature in powdered metallurgical techniques is well known in the art, so that a more detailed discussion of these conditions is unnecessary here. In this connnection, however, it is noteworthy that the melting point of Alloy A is 3333° F., so that a hot pressing temperature 833° F. lower than the melting point of the alloy was satisfactory.

The following example illustrates the production of a laminar structure according to the invention from layers comprising a particulate noble metal alloy and bodily separate masses, in the form of fibers, coated with the noble metal alloy.

*Example 2*

A mixture of 24.15 grams of Alloy A powder produced as described in Example 1 with 17 cc. of final solution of chloroplatinic acid and chlororhodic acid produced as there-described was formed into a paste which was manually pressed through a mat of aluminum silicate fibers weighing 6.04 grams. The fibers in the mat were in a jack-straw arrangement, randomly positioned, but all lying in essentially parallel planes. Most of the fibers in the mat had diameters ranging from 4 to 6 microns, but some were as fine as about 1 micron, and others were as coarse as about 10 microns.

The resulting mat was dried and inserted into a platinum-rhodium envelope similar to the envelope 10 of FIGS. 1 and 2, having one closed end, but composed of only two Alloy A sheets and sides. A hole, 0.020" in diameter, had previously been drilled on each side of the envelope near each end to enable the escape of air therefrom during subsequent processing.

The structure was heated at 800° F. for 3 hours to decompose the platinum-rhodium compounds to their respective metals in the form of a coating on the aluminum silicate fibers.

The open end of the envelope was then closed and oxy-hydrogen welded, as previously described.

The structure was cold pressed, then heated by resistance, and hot pressed at 2500° F. for one hour as in Example 1. It was then lightly rolled at 2500° F.

The specific composition of the aluminum silicate fibers used was as follows: $Al_2O_3$, 52.67 percent; $SiO_2$, 45.77 percent; $B_2O_3$, 1.06 percent; and $Na_2O$, 0.50 percent.

It will be apparent that various changes and modifications can be made from the specific details of the invention disclosed herein without departing from the spirit and scope of the attached claims.

What we claim is:

1. A method for producing a lamellar structure which comprises assembling a plurality of sheets, each of which sheets consists essentially of at least one noble metal, and a composite consisting essentially of particles of at least one noble metal and a plurality of bodily separate masses of from 0.25 to 10 microns in diameter of a hard, refractory, metal oxide material coated with said noble metal, said metal oxide constituting from about 0.9 percent to about 25 percent of the composite, into a structure wherein the composite is disposed between adjacent noble metal sheets, and subjecting the structure so produced to heat and pressure for a time sufficient to produce an integrated lamellar structure.

2. A method for producing a lamellar structure which comprises assembling a plurality of sheets, each of which sheets consists essentially of at least one noble metal, and a mixture consisting essentially of particles of at least one noble metal and a hard, refractory, particulate, metal oxide material from 0.25 to 10 microns in diameter and coated with said noble metal, said material constituting from about 0.9 percent to about 25 percent of the mixture, into a structure wherein the particulate material is disposed between adjacent noble metal sheets, and subjecting the structure so produced to heat and pressure for a time sufficient to produce an integrated lamellar structure.

3. A method for producing a lamellar structure which comprises assembling and supporting, in spaced relationship, a plurality of sheets, each of which consists essentially of at least one noble metal, placing a mixture consisting essentially of particles of at least one noble metal and a hard, refractory, particulate, metal oxide material from 0.25 to 10 microns in diameter and coated with said noble metal, said material constituting from about 0.9 percent to about 25 percent of the mixture, in spaces between the sheets, and subjecting the structure so produced to heat and pressure for a time sufficient to produce an integrated lamellar structure comprising layers of said noble metal and alternate layers of said mixture of said noble metal and said metal oxide material.

4. A method for producing a lamellar structure which comprises assembling and supporting, in generally parallel, spaced relationship, a plurality of sheets, each of which consists essentially of at least one noble metal, placing a mixture consisting essentially of particles of at least one noble metal and a hard, refractory, particulate, metal oxide material from 0.25 to 10 microns in diameter and coated with said noble metal, said material constituting from about 0.9 percent to about 25 percent of the mixture, in spaces between the sheets, and subjecting the structure so produced to heat and pressure for a time sufficient to produce an integrated lamellar structure comprising layers of said noble metal and alternate layers of said mixture of said noble metal and said metal oxide material.

5. A method for producing a lamellar structure which comprises assembling and supporting, in generally parallel, spaced relationship, a plurality of sheets, each of which consists essentially of at least one noble metal and comprises platinum, placing a mixture consisting essentially of particles of at least one noble metal comprising platinum and a hard, refractory, particulate, metal oxide material from 0.25 to 10 microns in diameter and coated with said noble metal, said material constituting from about 0.9 percent to about 25 percent of the mixture, in spaces between the sheets, and subjecting the structure so produced to heat and pressure for a time sufficient to produce an intergrated lamellar structure comprising layers of said noble metal and alternate layers of said mixture of said noble metal and said metal oxide material.

6. A method for producing a lamellar structure which comprises assembling and supporting, in generally parallel, spaced relationship, a plurality of sheets, each of which consists essentially of at least one noble metal and comprises rhodium, placing a mixture consisting essentially of particles of at least one noble metal comprising rhodium and a hard, refractory, particulate, metal oxide material from 0.25 to 10 microns in diameter and coated with said noble metal, said material constituting from about 0.9 percent to about 25 percent of the mixture, in spaces between the sheets, and subjecting the structure so produced to heat and pressure for a time sufficient to produce an integrated lamellar structure comprising layers of said noble metal and alternate layers of said mixture of said noble metal and said metal oxide material.

7. A method for producing a lamellar structure which comprises assembling and supporting, in generally parallel, spaced relationship, a plurality of sheets, each of which consists essentially of a platinum-rhodium alloy, placing a mixture consisting essentially of particles of the platinum-rhodium alloy and a hard, refractory, particulate, metal oxide material from 0.25 to 10 microns in diameter and coated with the platinum-rhodium alloy, said material constituting from about 0.9 percent to about 25 percent of the mixture, in spaces between the sheets, and subjecting the structure so produced to heat and pressure for a time sufficient to produce an integrated lamellar structure comprising layers of said platinum-rhodium alloy and alternate layers of said mixture consisting essentially of said platinum-rhodium alloy and said metal oxide material.

8. A method for producing a lamellar structure which comprises assembling and supporting, in generally parallel, spaced relationship, a plurality of sheets, each of which consists essentially of a platinum-rhodium alloy, placing a mixture consisting essentially of particles of platinum-rhodium alloy and particles of alumina from 0.25 to 10 microns in diameter and coated with the platinum-rhodium alloy, said alumina constituting from about 0.9 percent to about 25 percent of the mixture, in spaces between the sheets, and subjecting the structure so produced to heat and pressure for a time sufficient to produce an integrated lamellar structure comprising layers of said platinum-rhodium alloy and alternate layers of said mixture consisting of said platinum-rhodium alloy and said particles of alumina.

9. A method for producing a lamellar structure which comprises assembling and supporting, in generally parallel, spaced relationship, a plurality of sheets, each of which consists essentially of a platinum-rhodium alloy, placing a mixture consisting essentially of particles of the platinum-rhodium alloy and particles of zirconia from 0.25 to 10 microns in diameter and coated with the platinum-rhodium alloy, said zirconia constituting from about 0.9 percent to about 25 percent of the mixture, in spaces between the sheets, and subjecting the structure so produced to heat and pressure for a time sufficient to produce an integrated lamellar structure comprising layers of said platinum-rhodium alloy and alternate layers of said mixture consisting essentially of said platinum-rhodium alloy and said particles of zirconia.

10. A method for producing a lamellar structure which comprises assembling and supporting, in generally parallel, spaced relationship, a plurality of sheets, each of which consists essentially of a platinum-rhodium alloy, placing a mixture consisting essentially of particles of the platinum-rhodium alloy and particles of thoria from 0.25 to 10 microns in diameter and coated with the platinum-rhodium alloy, said thoria constituting from about 0.9 percent to about 25 percent of the mixture, in spaces between the sheets, and subjecting the structure so produced to heat and pressure for a time sufficient to produce an integrated lamellar structure comprising layers of said platinum-rhodium alloy and alternate layers of said mixture consisting essentially of said platinum-rhodium alloy and said particles of thoria.

11. A method for producing a lamellar structure which comprises assembling and supporting, in generally parallel, spaced relationship, a plurality of sheets, each of which consists essentially of at least one noble metal and comprises palladium, placing a mixture consisting essentially of particles of at least one noble metal comprising palladium and a hard, refractory, particulate, metal oxide material from 0.25 to 10 microns in diameter and coated with the noble metal, said material constituting from about 0.9 percent to about 25 percent of the mixture, in spaces between the sheets, and subjecting the structure so produced to heat and pressure for a time sufficient to produce an integrated lamellar structure comprising layers of said noble metal and alternate layers of said mixture consisting essentially of said noble metal and said metal oxide material.

12. A method for producing a lamellar structure which comprises assembling a plurality of sheets, each of which sheets consists essentially of at least one noble metal, and a composite which is a sintered sheet consisting essentially of bodily separate masses of from 0.25 to 10 microns in diameter of a hard, refractory, metal oxide material coated with said noble metal, said metal oxide constituting from about 0.9 percent to about 25 percent of the composite, and dispersed in a matrix consisting essentially of particles of at least one noble metal, said particles being sintered together to form a continuous phase, into a structure wherein the comprosite is disposed between adjacent noble metal sheets, and subjecting the structure so produced to heat and pressure for a time sufficient to produce an integrated lamellar structure.

13. A method for producing a lamellae structure which comprises assembling a plurality of sheets, each of which sheets consists essentially of at least one noble metal, and a composite consisting essentially of particles of at least one noble metal and a plurality of fibers, of from 0.25 to 30 microns in diameter, of a hard, refractory, metal oxide material coated with said noble metal, said fibers constituting from about 0.9 percent to about 25 percent of the composite, into a structure wherein the composite is disposed between adjacent noble metal sheets, and subjecting the structure so produced to heat and pressure for a time sufficient to produce an integrated lamellar structure.

14. A method for producing a lamellar structure which comprises assembling a plurality of sheets, each of which sheets consists essentially of at least one noble metal, and a composite which is a sintered sheet consisting essentially of fibers, of from 0.25 to 30 microns in diameter, of a hard, refractory, metal oxide material coated with said noble metal, said fibers constituting from about 0.9 percent to about 25 percent of the composite, and dispersed in a matrix consisting essentially of particles of at least one noble metal, said particles being sintered together to form a continuous phase, into a structure wherein the composite is disposed between adjacent noble metal sheets, and subjecting the structure so produced to heat and pressure for a time sufficient to produce an integrated lamellar structure.

References Cited by the Examiner

UNITED STATES PATENTS

| 1,675,867 | 7/28 | Pike | 75—47 |
| 2,017,757 | 10/35 | Keller et al. | 29—197.5 XR |
| 2,100,537 | 11/37 | Conway | 75—47 XR |

JOHN F. CAMPBELL, *Primary Examiner.*